United States Patent [19]
Edejer et al.

[11] Patent Number: 4,692,754
[45] Date of Patent: Sep. 8, 1987

[54] ROTATION INDICATING DEVICE

[75] Inventors: Merardo P. Edejer, Westlake; Roger S. Ford; John J. Jailor, both of North Ridgeville, all of Ohio; Michael J. Jens, Burns, Tenn.

[73] Assignee: The Scott & Fetzer Company, Cleveland, Ohio

[21] Appl. No.: 868,956

[22] Filed: May 30, 1986

[51] Int. Cl.$^4$ .............................................. G08B 21/00
[52] U.S. Cl. ..................................... 340/671; 15/319; 340/679
[58] Field of Search ................ 340/671, 679; 116/202; 15/319

[56] References Cited
U.S. PATENT DOCUMENTS
4,245,370 1/1981 Baker ..................................... 15/319

Primary Examiner—Stewart J. Levy
Assistant Examiner—Joseph W. Roskos
Attorney, Agent, or Firm—Pearne, Gordon, McCoy & Granger

[57] ABSTRACT

A small self-contained unit is provided to indicate rotation of a machine element such as a brush in a domestic vacuum cleaner. The rotation indicating device may be mounted inside the nozzle of the vacuum cleaner so that through an aperture in the vacuum cleaner nozzle, an indicator lamp may be observed, and it will be illuminated upon rotation of the vacuum cleaner brush. The rotation indicating device includes a housing which carries the lamp in a fixed longitudinal position on the housing, which accommodates a wire coil within the housing and the coil cooperates with a rotating magnet on the rotating brush. All of the parts are fixed in longitudinal position so that when the indicating device is mounted in the vacuum cleaner, the wire coil is in position to cooperate with the magnet and the lamp is in position adjacent the vacuum cleaner nozzle aperture.

16 Claims, 4 Drawing Figures

ROTATION INDICATING DEVICE

BACKGROUND OF THE INVENTION

Apparatus has previously been proposed to indicate rotation of elements shielded from direct view by a user. U.S. Pat. No. 4,245,370 to Baker discloses such a device. In this device, a magnet is carried by a rotating beater brush housed within the rug cleaning nozzle of a domestic vacuum cleaner. The magnet revolves about the axis of rotation of the beater brush as it rotates. A Hall effect sensor located adjacent to the path of the revolving magnet provides a pulse signal, the frequency of which is indicative of the rotational speed of the beater brush. This sensor signal is supplied to a relatively complex, externally powered control circuit that performs various functions, including illumination of a selected one of a plurality of user-viewable light emitting diodes which indicate the rotational status of the beater brush.

The copending application of John F. L. England, Ser. No. 806,699, filed Dec. 9, 1985, entitled "Self-Powered Rotation Indicator," and incorporated herein by reference in its entirety, discloses a rotation indicator which may be used in conjunction with a rotating machine element which is normally shielded from direct view of the user. That invention may be utilized in a domestic vacuum cleaner nozzle, and discloses a luminous indicator device which is electrically powered solely be energy derived from the rotating element which the indicator is monitoring. Such application discloses a rotating permanent magnet cooperating with a coil of wire to generate an alternating voltage in the coil which is supplied to a light emitting diode lamp viewable by the user of the vacuum cleaner through an aperture in the nozzle of the vacuum cleaner.

The prior art Baker device functions to provide a visual indication of the rotational status of a rug beater brush, yet its complexity makes it unattractive from a cost and reliability standpoint, it being recognized that the domestic appliance business is highly competitive. The prior art device disclosed in the above-mentioned copending application provides an indicator unit with only a small number of parts, yet it has been determined that the large number of turns of fine wire on the coil, the connection of the coil to the lamp, and the difficulty of positioning the parts caused the manufacturing cost to be excessive.

SUMMARY OF THE INVENTION

The problem to be solved, therefore, is how to construct a rotation indicating device which will be hermetically sealed, which will provide adequate stability of the components despite machine vibration, which will be resistant to damage from shock, will protect the component parts from the ambient atmosphere, and which can be readily mounted in the machine casing with which it is to be used so that the indicator lamp is readily visible, and so that the total cost of the unit, including assembly labor, is minimized.

This problem is solved by a rotation indicating device for use in a machine having a rotating magnet on a rotating member in a casing, said rotation indicating device comprising, in combination, a housing having a longitudinal wall, a first end wall through which a longitudinal axis extends and an open side, longitudinal locator means on said first end wall generally along said longitudinal axis, a longitudinally facing locator shoulder on said housing adapted to be complementary to a shoulder on the machine casing, a preassembly of a flexible wire coil and an indicator lamp having two leads, means connecting said lamp leads to the ends of the flexible wire coil, the flexibility of said wire ends establishing said coil and said indicator lamp subassembly as having a variable length, a magnetically permeable core for said coil, said subassembly being inserted in said housing through said open side with said wire coil received on said core and said lamp received on said longitudinal locator means, and means to fix said coil in said housing and fix said indicator lamp on said longitudinal locator means to establish a predetermined length of the entire rotation indicating device whereby said lamp is adapted to be positioned at an aperture in the machine casing upon said locator shoulder engaging the shoulder in the machine casing.

The problem is further solved by a rotation indicating device for use in a machine having a rotating magnet on a rotating member in a casing, said rotation indicating device comprising, in combination, a housing having an opening, a coil of flexible wire mounted on a magnetic core in said housing, an indicator lamp mounted on said housing to be visible exteriorly of said housing, two leads of said lamp being connected to said coil of wire, a curable liquid enterable through said opening substantially filling said housing and curable by at least one frequency band of electromagnetic radiation, said housing being substantially transparent to said at least one frequency band of electromagnetic radiation, and said curable liquid being cured in said housing.

Accordingly, an object of the invention is to provide a rotation indicating device mounted in a preformed housing, with the cavity filled with a potting compound hermetically sealing and fixing all parts in a predetermined position to be resistant to damage from vibration, shock, and the elements.

Another object of the invention is to provide a rotation indicating device with a support post for the indicating lamp.

A further ofject of the invention is to provide a rotation indicating device with a housing having slots to receive the conductors of the indicator lamp.

Other objects and a fuller understanding of the invention may be had by referring to the following description and claims, taken in conjunction with the accompanying drawings.

DESCRIPTION OF THE PREFERRED EMBODIMENT

Figure 2:
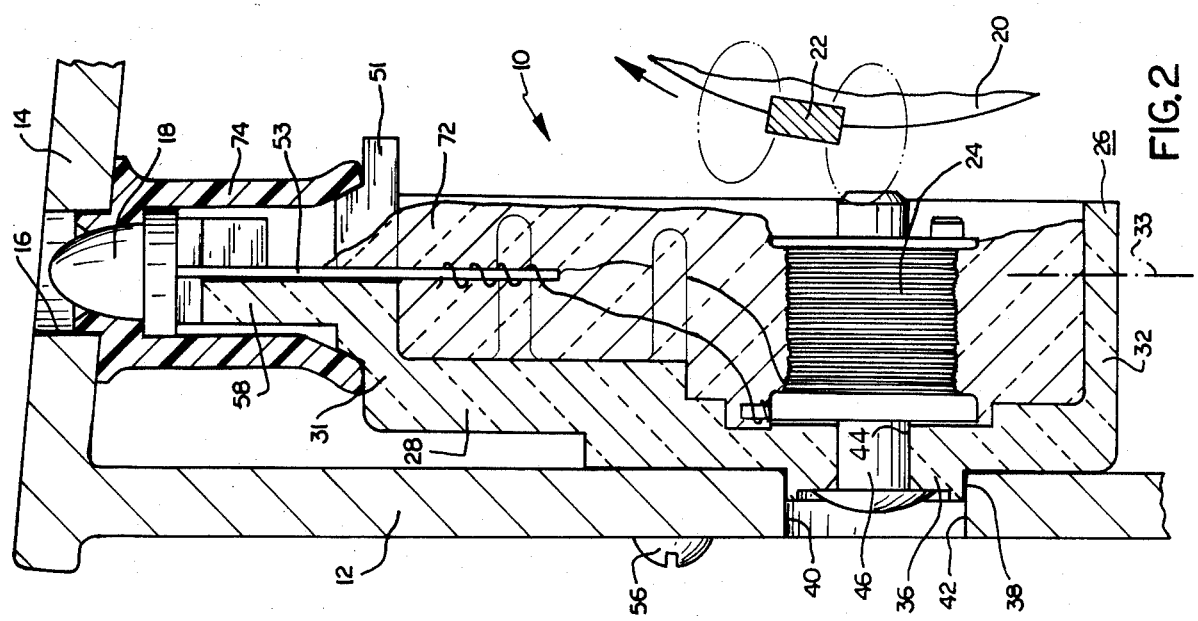
FIG. 2 is a longitudinal, sectional view of the rotation indicator device on line 2—2 of FIG. 4.

The figures of the drawing illustrate a rotation indicating device 10 which may be incorporated in most any type of machine having a rotating element the rotation of which is to be detected. FIG. 2 illustrates a casing 12 of a machine, and this might be a domestic vacuum cleaner such as that shown in copending application Ser. No. 806,699 filed on Dec. 9, 1985. Additional details of the structure of such vacuum cleaner, assigned to the assignee of the present invention, may be had by the reference to that application, the entirety of which is incorporated herein by reference.

The vacuum cleaner or machine casing 12 may have a top wall 14, which in FIG. 2 is shown at the top of this figure. This top wall has an aperture 16 so that an indicator lamp 18 may be viewed by the user of the vacuum cleaner. The vacuum cleaner may have a rotating brush or other rotating element 20, the rotational status of which is indicated to the user of the vacuum cleaner by the indicator lamp 18. This rotating brush carries a magnet 22, such as a permanent magnet, for cooperation with a coil of wire 24. The magnet may have north and south poles, one facing radially outwardly and the other facing radially inwardly, so that the magnetic lines of flux will cut the turns of the wire coil 24. By this means, an alternating voltage is generated in the coil and is directed to the indicator lamp 18 to illuminate this lamp.

The rotation indicating device includes a transparent plastic housing 26 which has a longitudinal bottom wall 28, side walls 29 and 30, and first and second end walls 31 and 32 through which a longitudinal axis 33 extends. The housing 26 has an opening, and prefereably has an open side such as the open top 34. The bottom wall 28 has an exterior boss 36 which provides a longitudinally facing shoulder 38. The boss 36 is circular in shape to be complementary to an aperture 40 in the machine casing 12, and accordingly this aperture 40 provides a shoulder 42 which may be engaged by the longitudinally facing shoulder 38 on the housing 26. An aperture 44 is provided through the bottom wall 28 centrally of the boss 36 and receives a magnetically permeable core 46 which may be in the shape of a rivet, with the head thereof engaging the exterior boss 36. This core 46 may have a tight or press fit in the aperture 44 in order to be in a fixed position in the housing 26. The bottom wall 28 also includes two upstanding studs 48. The first end wall 31 includes slots 50 and 51 to receive the leads 53 and 53 of the indicator lamp 18. The side wall 30 has a cylindrical wall 54 defining an aperture 55 adapted to receive a self-tapping screw 56 by which the entire rotation indicating device 10 may be secured to the machine casing 12.

The first end wall 31 provides a longitudinal locator means, shown as a post 58, for the indicator lamp 18. This post is on the exterior surface of the end wall 31, and extends generally along the longitudinal axis 33. The post 58 has an abutment end 59 to abut the underside of the lamp 18 for longitudinal positioning of the lamp. The post also has grooves 60 to receive the two leads 52 and 53.

Figure 3:
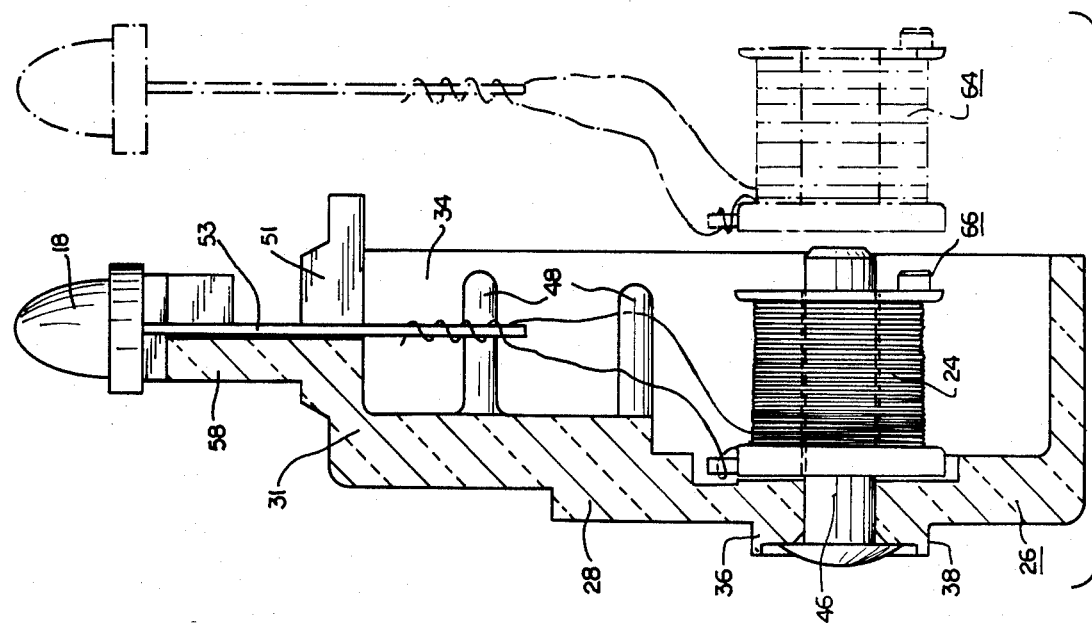
FIG. 3 is a longitudinal, sectional view on the same line of FIG. 4, showing the subassembly of the coil and lamp in phantom in preassembly position.
Figure 4:
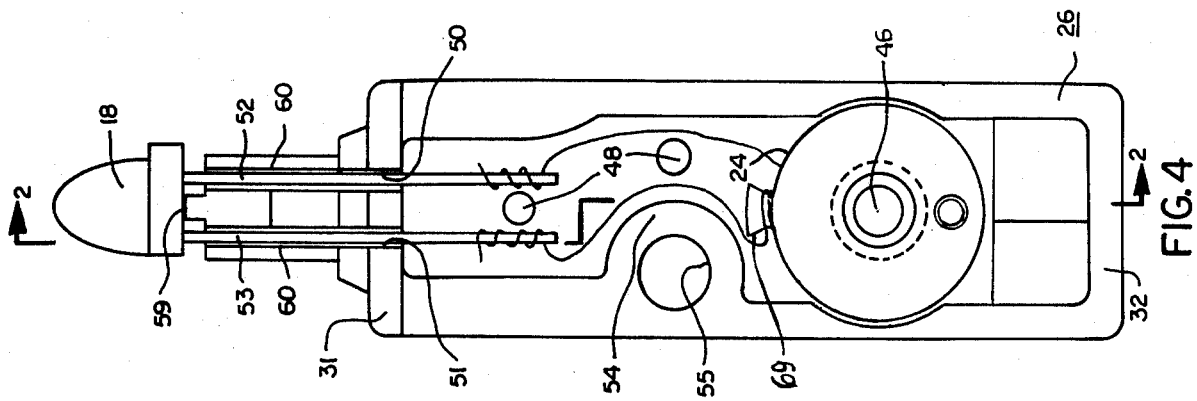
FIG. 4 is a plan view of the rotation indicator device.

A preassembled subassembly 64 of a flexible wire coil 24 and lamp 18 are provided as shown in the upper phantom portion of FIG. 3. The wire coil is many turns of very fine wire, for example 40-gauge wire, and these are wound on a bobbin 66 which has a first flange 67 and a second flange 68. One wire end, such as the finish of the coil 24, is wound a few turns around a wire tie 69 premolded as part of the bobbin flange 67. The anchors the wire end for handling of the coil. The two ends of the wire coil 24 are cleaned of insulation, wound around the ends of the leads 52 and 53 of the lamp 18, and then secured to the ends of the leads 52 and 53 at electrical connections 70 and 71. This connection may be made by soldering, such as dip soldering or wave soldering. It will be noted that this subassembly 64 has a variable length dimension because of the extreme flexibility of the ends of the wire coil 24.

Figure 1:
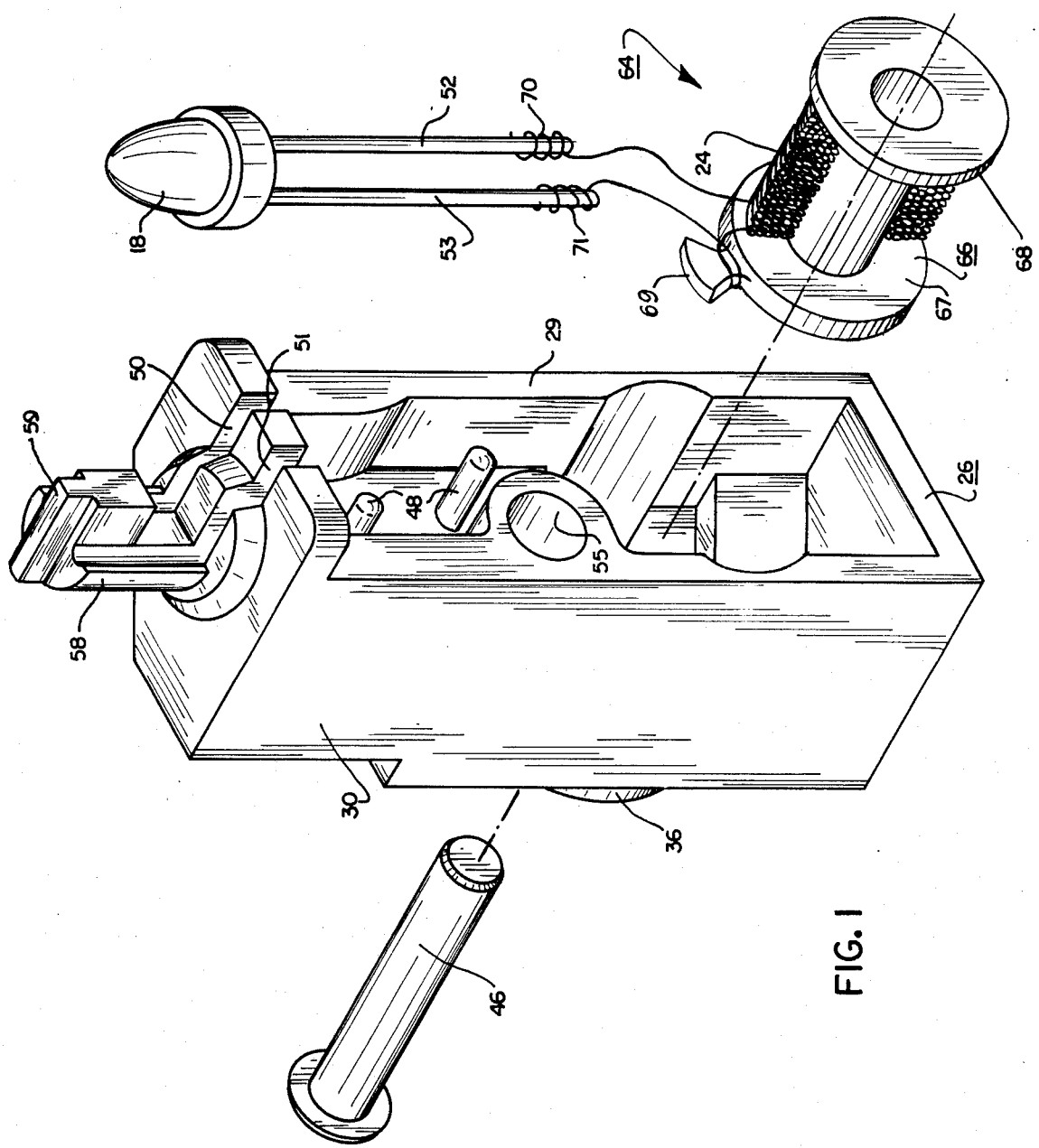
FIG. 1 is a perspective, exploded view of the components of the rotation indicator device.

The subassembly 64 may be easily created, and no intermediate conductors of a gauge intermediate to that of the wire coil and the leads 52, 53 need by provided between the coil and the lamp leads. The assembly of the entire rotation indicating device is greatly simplified over that of the prior art. FIG. 1 illustrates the three main parts prior to complete assembly. The rivet-shaped, magnetically permeable core 46 may be press-fitted into place in the aperture 44 from the exterior of the housing 26. The subassembly 64 may then be assembled to the housing by the bobbin 66 being pushed down over the exposed end of the core 46, the lamp 18 on the exterior end of the post 58 and the leads 52 and 53 being inserted in the slots 50 and 51, respectively. As the subassembly 64 is put into place, the ends of the wire coil 24 are kept separated by the studs 48. The press fit of the core 46 in the housing 26 and the snug fit of the bobbin 66 on this core 46 is a means to fix the coil 24 in a fixed position relative to the housing 26. Also, the lamp 18 is fixed in position by a curable liquid 72 which engages the lamp leads 52 and 53. Preferably, this curable liquid substantially fills the housing 26 and is inserted through the open side 34 and in so filling this housing, the additional function is served of hermetically sealing the entire unit and aiding in securing the coil 24 in place. The two wire ends preferably are both adjacent the second bobbin flange 68 at the bottom of the housing 26, and this assures that both wire ends are well immersed in the potting compound. Further, this potting compound helps secure the connection of the small gauge wire ends to the lamp leads 52 and 53, and makes certain that these flexible leads will not be broken by vibration, shock, or some accidental contact with an object. The fixing of the lamp 18 in a longitudinal position, primarily by the potting compound 72, provides a one-piece unit which may be handled relatively carelessly by even untrained personnel without fear of damaging the unit. Also, this fixing of the lamp 18 and of the coil 24 establishes a predetermined length of the entire rotation indicating device 10, whereby the lamp is adapted to be positioned at the aperture 16 in the machine casing 12 when the device 10 is installed in the machine and the locator shoulder 38 engages the shoulder 42 in the machine casing 12. These shoulders 38 and 42 will engage when the boss 36 is received partially into the casing aperture 40 and the device 10 secured by the self-tapping machine screw 56. This assures that the indicating device 10 is properly positioned both so that the lamp 18 cooperates with the aperture 16 and so that the coil core 46 cooperates with the rotating magnet 22.

In one practical embodiment of the invention, the indicating lamp 18 is a light emitting diode which requires only a small amount of power to be illuminated for a user to observe, and this power may be produced by the rotating magnet and the multi-turn coil 24.

The housing 26 is made of some plastic material which is substantially transparent to at least one frequency band of electromagnetic radiation. In the preferred embodiment, the housing is a transparent plastic and the frequency band is ultraviolet light. By this means, the curable liquid 72 may be chosen to be one which is curable by this frequency band, namely, curable by ultraviolet light. In this manner, successive potting compound-filled units may be fed successively, as by a conveyor belt, into a light tunnel so that light may penetrate 360 degrees around the units for a rapid cure of the curable liquid. This helps assure that the liquid is cured throughout at substantially the same rate so that any shrinkage therein will not displace the delicate ends of the wire coil, which might break them loose from their electrical connections 70 and 71 to the lamp leads. The lamp leads 52 and 53 have a fairly close fit within the slots 50 and 51, but need not be a snug fit. The slots may be slightly oversize to enable them to accommodate lamps of different manufacturers who might use slightly different wire gauge for the leads. Even though these slots are somewhat oversize, it has been observed that the potting compound will not have any appreciable leakage through such slots because the potting compound may be suitably thixotropic and will rapidly resume a gel condition when substantially at rest as the potting compound is filled into the housing. At least one of the lamp leads is disposed in a slot in the end wall and this preferred embodiment shows each lead disposed in a slot. This permits the housing 26 to be made in only a two-part die rather than a three-part die for simplicity and rapidity of manufacture of the individual housings 26.

An elastomeric gasket 74 may be provided in a generally tubular form to pass over the lamp 18 and the post 58 prior to mounting of the rotation indicating device 10 in the machine casing 12. Where the device 10 is used in a vacuum cleaner, for example, the elastomeric gasket 74 seals around the aperture 16 so that the partial vacuum in the vacuum cleaner nozzle will not be lost through this aperture. The post 58 is made with transverse dimensions no greater than the base of the lamp 18, so that the gasket 74 may readily be placed over the lamp and post and will be retained in place, ready for easy mounting of the device 10 in the machine casing 12.

The present disclosure includes that contained in the appended claims, as well as that of the foregong description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A rotation indicating device for use in a machine having a rotating magnet on a rotating member in a casing;
    said rotation indicating device comprising, in combination:
    a housing having a longitudinal wall, a first end wall through which a longitudinal axis extends and an open side;
    longitudinal locator means on said first end wall generally along said longitudinal axis;
    a longitudinally facing locator shoulder on said housing adapted to be complementary to a shoulder on the machine casing;
    a preassembled subassembly of a flexible wire coil and an indicator lamp having two leads;
    means connecting said lamp leads to the ends of the flexible wire coil;
    the flexibility of said wire ends establishing said coil and said indicator lamp subassembly as having a variable length;
    a magnetically permeable core for said coil;
    said subassembly being inserted in said housing through said open side with said wire coil received on said core and said lamp received on said longitudinal locator means; and
    means to fix said coil in said housing and fix said indicator lamp on said longitudinal locator means to establish a predetermined length of the entire rotation indicating device whereby said lamp is adapted to be positioned at an aperture in the machine casing upon said locator shoulder engaging the shoulder in the machine casing.

2. A rotation indicating device according to claim 1, wherein said longitudinal locator means extends exteriorly of said first end wall.

3. A rotation indicating device according to claim 1, wherein said longitudinal locator means is on the exterior of said first end wall.

4. A rotation indicating device according to claim 1, wherein said longitudinal locator means is a post extending longitudinally exteriorly of said first end wall and extends between said two lamp leads.

5. A rotation indicating device according to claim 4, wherein said post has transverse dimensions no greater than those of said indicator lamp to be adapted to receive a flexible gasket over said lamp and said post.

6. A rotation indicating device according to claim 1, wherein said fixing means includes a potting compound in said housing to secure said coil and leads in place and to longitudinally secure said lamp for a fixed longitudinal dimension of said device.

7. A rotation indicating device according to claim 1, wherein said housing is substantially tranparent to at least one frequency band of electromagnetic radiation, and said fixing means includes a potting compound in said housing curable by electromagnetic radiation at said one frequency band.

8. A rotation indicating device according to claim 1, wherein said housing is transparent, and said fixing means includes a potting compound in said housing cured by ultraviolet light.

9. A rotation indicating device according to claim 1, wherein said first end wall has two slots extending from said open side, and said two leads of said indicator lamp are disposed one in each of said slots.

10. A rotation indicating device according to claim 9, wherein said fixing means includes a potting compound in said housing, said leads being closely received in said slots to minimize leakage of said potting compound through said slots before cure of said potting compound.

11. A rotation indicating device according to claim 1, including a slot in said end wall, and at least one of said lamp leads extends through said slot.

12. A rotation indicating device for use in a machine having a rotating magnet on a rotating member in a casing, said rotation indicating device comprising, in combination:
    a housing having an opening;
    a coil of flexible wire mounted on a magnetic core in said housing;
    an indicator lamp mounted on said housing to be visible exteriorly of said housing;
    two leads of said lamp being connected to said coil of wire;
    a curable liquid enterable through said opening substantially filling said housing and curable by at least one frequency band of electromagnetic radiation;

said housing being substantially transparent to said at least one frequency band of electromagnetic radiation;

and said curable liquid being cured in said housing.

13. A rotation indicating device according to claim 12, wherein said housing is transparent and said curable liquid being cured by ultraviolet light.

14. A rotation indicating device according to claim 12, including means including said cured liquid to fix said coil and lamp relative to said housing.

15. A rotation indicating device according to claim 12, including at least one slot in a wall of said housing, at least one of said leads of said lamp disposed in said at least one slot with said coil being inside said housing and contacted by said cured liquid.

16. A rotation indicating device according to claim 12, including two slots in a wall of said housing, said two leads of said lamp being disposed one in each of said slots with said lamp exterior to said housing and the connection of the leads to said coil being inside said housing and covered by said cured liquid.

* * * * *